US012700237B2

(12) United States Patent
Wang et al.

(10) Patent No.: US 12,700,237 B2
(45) Date of Patent: Aug. 4, 2026

(54) VIDEO FEATURE EXTRACTION METHOD, DEVICE AND COMPUTER-READABLE STORAGE MEDIUM

(71) Applicant: UBTECH ROBOTICS CORP LTD, Shenzhen (CN)

(72) Inventors: Kan Wang, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 283 days.

(21) Appl. No.: 18/427,775

(22) Filed: Jan. 30, 2024

(65) Prior Publication Data

US 2024/0290097 A1      Aug. 29, 2024

(30) Foreign Application Priority Data

Feb. 28, 2023     (CN) .......................... 202310223107.1

(51) Int. Cl.
*G06V 20/40* (2022.01)
*G06V 10/74* (2022.01)
*G06V 10/77* (2022.01)
*G06V 10/82* (2022.01)

(52) U.S. Cl.
CPC ............ *G06V 20/46* (2022.01); *G06V 10/761* (2022.01); *G06V 10/7715* (2022.01); *G06V 10/82* (2022.01); *G06V 20/48* (2022.01)

(58) Field of Classification Search
CPC ...... G06V 10/82; G06V 20/46; G06V 10/764; G06V 10/806; G06V 20/49; G06V 40/168; G06V 20/48; G06V 10/80; G06V 10/40; G06V 10/7715; G06V 10/761; G06N 3/045; G06N 3/08; G06N 3/0464; G06T 2207/20084; G06T 2207/10016; G06T 2207/20081; G06T 5/60; G06T 7/33
See application file for complete search history.

(56) References Cited

U.S. PATENT DOCUMENTS 10,956,748 B2 * 3/2021 Tang ..................... G06N 3/0464
11,967,151 B2 * 4/2024 Li ......................... G06V 10/806

FOREIGN PATENT DOCUMENTS

CN       110991321 A * 4/2020 ........... G06F 18/253

OTHER PUBLICATIONS

Google Patents translation of CN110991321A (Year: 2020).*

* cited by examiner

*Primary Examiner* — Courtney Joan Nelson

(57) ABSTRACT

A method for extracting video features may include: obtaining a target video sequence that comprises a number of video frames; performing video frame feature extraction on the target video sequence to obtain video frame features of each of the video frames; performing feature weight calculation on each of the video frame features to obtain the feature weight of each of the video frame features; wherein the feature weight of each of the video frame features is determined by the video frame features of all of the video frames in the target video sequence; and performing feature weighting on each of the video frame features according to the feature weight of each of the video frame features to obtain video features of the target video sequence.

20 Claims, 5 Drawing Sheets

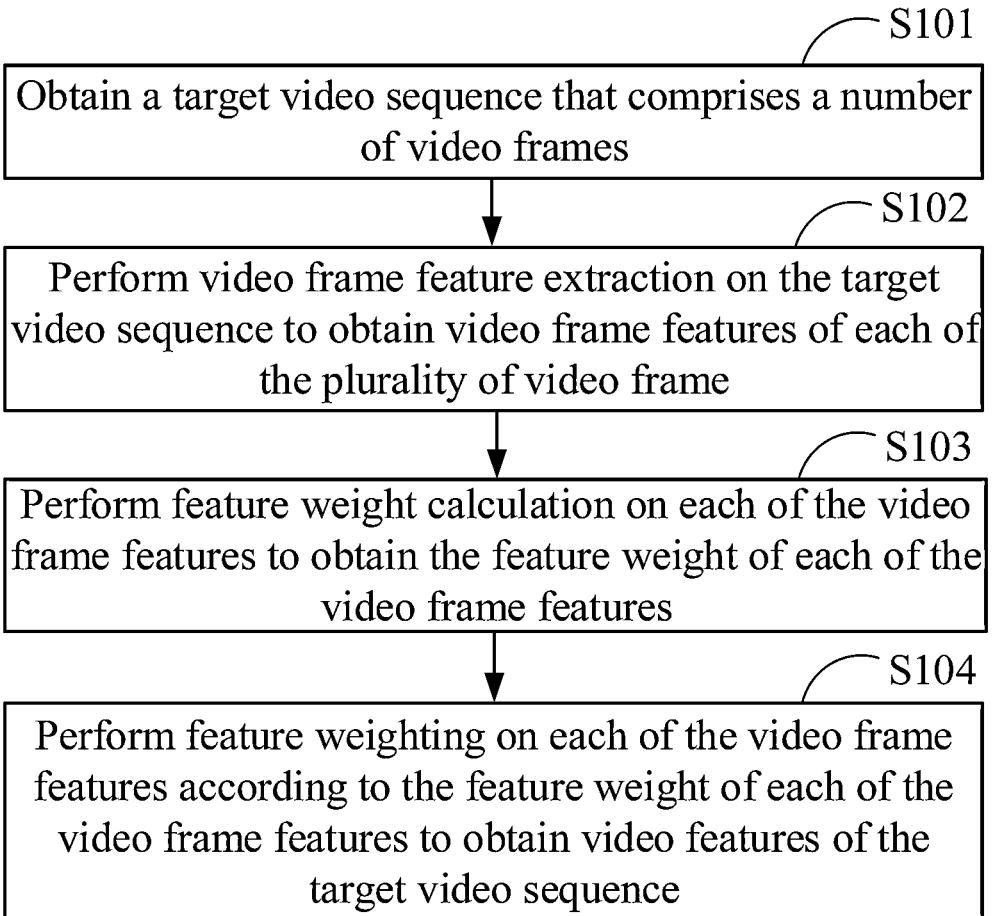

S101

Obtain a target video sequence that comprises a number of video frames

S102

Perform video frame feature extraction on the target video sequence to obtain video frame features of each of the plurality of video frame

S103

Perform feature weight calculation on each of the video frame features to obtain the feature weight of each of the video frame features

S104

Perform feature weighting on each of the video frame features according to the feature weight of each of the video frame features to obtain video features of the target video sequence

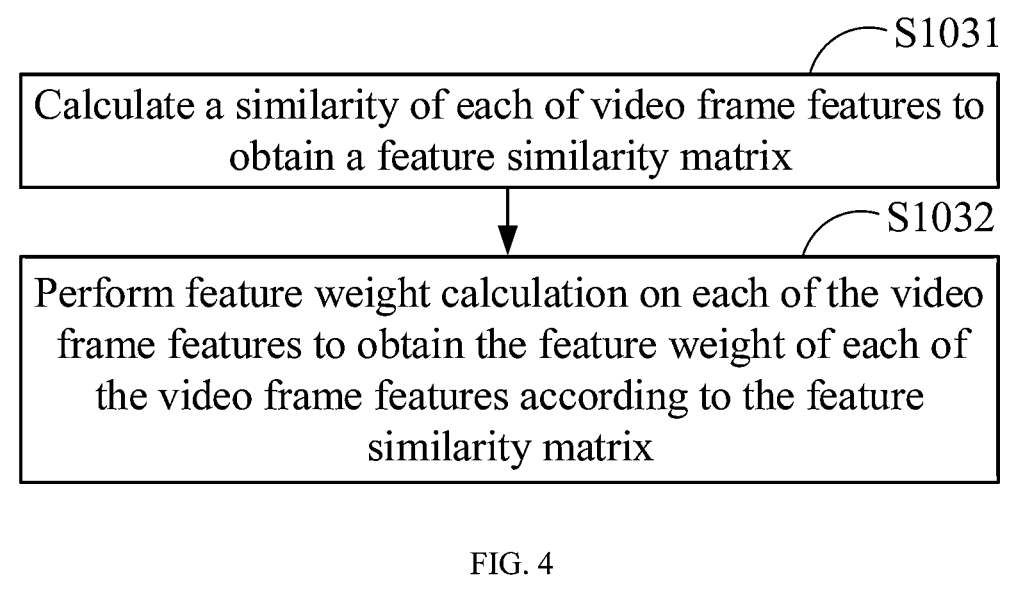

Calculate a similarity of each of video frame features to obtain a feature similarity matrix

S1032

Perform feature weight calculation on each of the video frame features to obtain the feature weight of each of the video frame features according to the feature similarity matrix

FIG. 4

Video Sequence Acquisition Module    401

Video Frame Feature Extraction Module    402

Feature Weight Calculation Module    403

Feature Weighting Module    404

VIDEO FEATURE EXTRACTION METHOD, DEVICE AND COMPUTER-READABLE STORAGE MEDIUM

CROSS REFERENCE TO RELATED APPLICATIONS

This application claims priority to Chinese Patent Application No. CN 202310223107.1, filed Feb. 28, 2023, which is hereby incorporated by reference herein as if set forth in its entirety.

TECHNICAL FIELD

The present disclosure generally relates to video recognition, and in particular relates to a video feature extraction method, device and computer-readable storage medium.

BACKGROUND

Video feature extraction technology refers to extracting feature information from video sequences in order to use the feature information to identify the video sequence. With the development of artificial intelligence technology, various types of videos are becoming more and more abundant, and video learning tasks are becoming increasingly complex. The accurate extraction of video frame features becomes particularly important.

However, some conventional methods for extracting video frame features can only extract local features of video sequence, but cannot fully and accurately describe the complete feature information of the video sequence, resulting in poor robustness of these video feature extraction methods.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a video feature extraction method according to one embodiment.

FIG. 4 is a schematic flowchart of calculation of video frame feature weights according to one embodiment.

DETAILED DESCRIPTION

Figure 1:
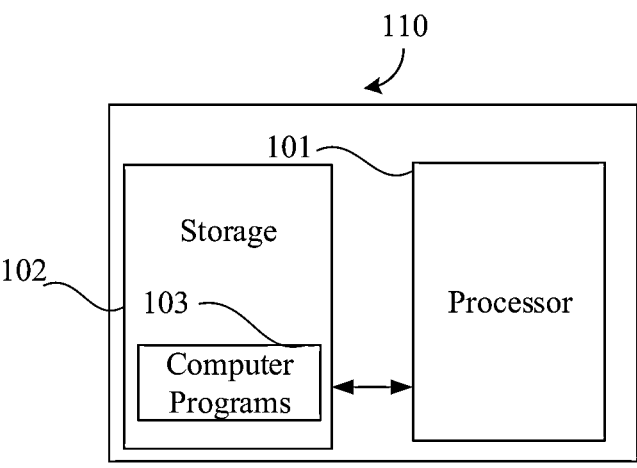
FIG. 1 is a schematic block diagram of a device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 shows a schematic block diagram of a device 110 according to one embodiment. The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a video feature extraction method, such as steps S101 to S104 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 5:
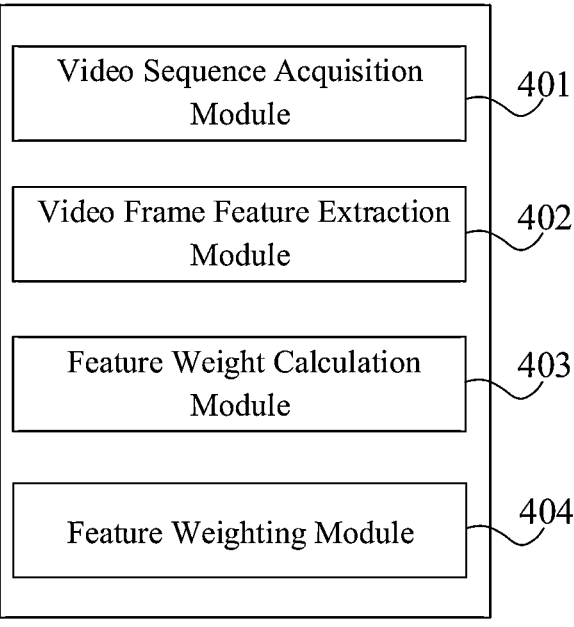
FIG. 5 is a schematic block diagram of a video feature extraction device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into a video sequence acquisition module 401, a video frame feature extraction module 402, a feature weight calculation module 403, and a feature weighting module 404 as shown in FIG. 5.

It should be noted that the block diagram shown in FIG. 1 is only an example of the device 110. The device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a video frame feature extraction method according to one embodiment. As an example, but not a limitation, the method can be implemented by the device 110. The method may include the following steps.

Step S101: Obtain a target video sequence that comprises a number of video frames.

In one embodiment, a video sequence that requires video feature extraction can be used as the target video sequence. The target video sequence can include multiple video frames.

In one embodiment, the target video sequence can be captured through a preset image capturing device. For example, video can be captured by a surveillance camera installed at a preset location and used as a target video sequence.

In another embodiment, after the target video sequence is captured, it can be stored in a preset location, and the target video sequence can be obtained in time when video feature extraction is required. For example, the target video sequence can be stored in the storage module of a terminal device. When video feature extraction is required, the target video sequence can be directly obtained from the storage module of the terminal device. For another example, in order to achieve safe data backup, the terminal device can regularly upload data to a cloud server, and the target video sequence can thus be stored in the cloud server. When video feature extraction is required, a video sequence acquisition request can be sent to the cloud server, and the target video sequence can be obtained by parsing the response message returned by the cloud server.

In another embodiment, in order to improve the efficiency of video feature extraction, frame extraction processing can be performed on the acquired video sequence to obtain the target video sequence. For example, one frame per second can be extracted from the video sequence to obtain the target video sequence including multiple video frames.

Step S102: Perform video frame feature extraction on the target video sequence to obtain video frame features of each of the plurality of video frame.

In one embodiment, after the target video sequence is obtained, the target video sequence can be split to obtain multiple video frames in the target video sequence.

It can be understood that since the target video sequence contains multiple video frames, the video features of the target video sequence can be obtained by performing feature fusion on the video frame features of the video frames.

Figure 3:
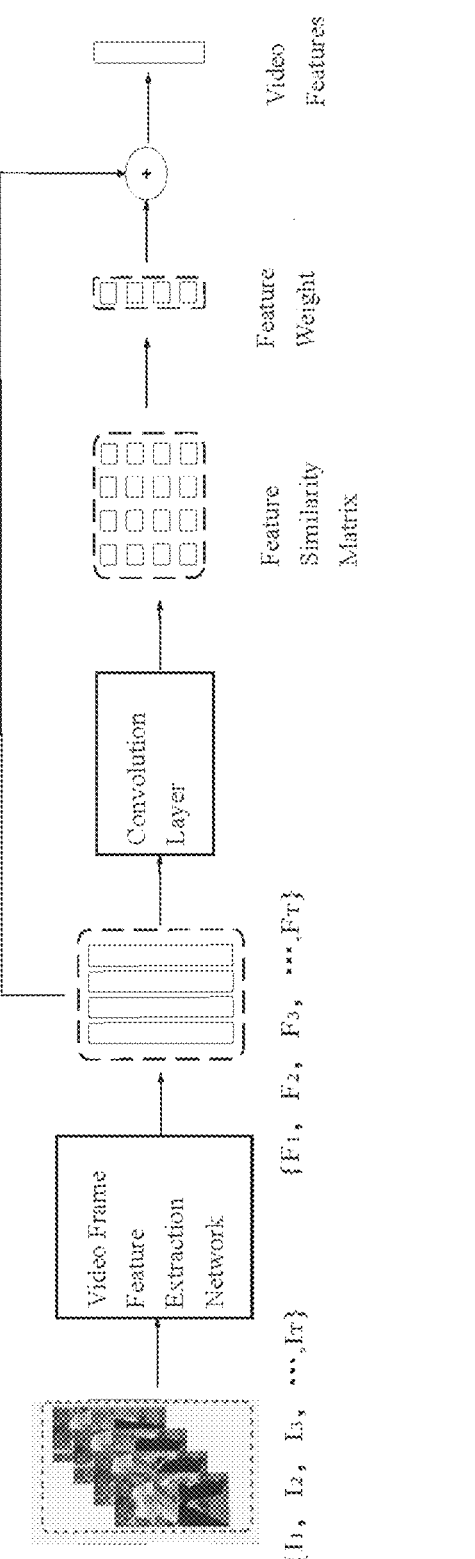
FIG. 3 is a schematic diagram of video feature extraction.

Specifically, for each video frame, video frame feature extraction can be performed to obtain necessary feature information in the video frame and obtain corresponding video frame features. Referring to FIG. 3, through a preset video frame feature extraction network, video frame features can be extracted for the video frames $\{I_1, I_2, I_3, \ldots, I_T\}$ in the target video sequence to obtain the video frame features $\{F_1, F_2, F_3, \ldots, F_T\}$ of each corresponding video frame. The video frame feature extraction network may be a deep neural network for video frame feature extraction.

It should be noted that the present disclosure does not specifically limit the selection of the video frame feature extraction network, and it can be set according to actual needs. For example, it could be a convolutional neural network (CNN) or a recurrent neural network (RNN), which are commonly used deep neural networks for feature extraction in conventional technologies.

In one embodiment, the selected deep neural network can be trained in advance to obtain the video frame feature extraction network. The video frame feature extraction network can be directly used in subsequent video frame feature extraction.

Step S103: Perform feature weight calculation on each of the video frame features to obtain the feature weight of each of the video frame features.

In one embodiment, the feature weight of each of the video frame features can be determined by the video frame features of all of the video frames in the target video sequence. Since the feature weight of each video frame feature takes into account all video frame features, more complete video feature information can be extracted, and the global feature information of the target video sequence can be understood, making the target video sequence better interpretable.

In one embodiment, step S103 may include the following steps.

Step S1031: Calculate a similarity of each of video frame features to obtain a feature similarity matrix.

It should be noted that since video frame features may contain multi-dimensional feature information, and there may be irrelevant or redundant feature information, directly using video frame features for similarity calculations may result in significant computational complexity. In view of this, in one embodiment, a preset convolution layer can be first used to perform a convolution operation on each video frame feature, so that the video frame features are dimensionally reduced and the feature vector of each video frame feature is obtained. After that, similarity calculation can be performed on each video frame feature based on the feature vector of each video frame feature to obtain a feature similarity matrix.

Specifically, referring to FIG. 2, each video frame feature can be input to the convolution layer for convolution operation to obtain the feature vector of each video frame feature. For any two video frame features, the video frame feature similarity can be calculated. The specific calculation equation can be as follows:

$$K_{i,j} = \frac{\|f(F_i)f(F_j)\|}{\|f(F_i)\|\|f(F_j)\|},$$

where $K_{i,j}$ represents the feature similarity between an i-th video frame feature $F_i$ and a j-th video frame feature $F_j$, $f(F_i)$ represents the feature vector of the video frame feature $F_i$, $f(F_j)$ represents the feature vector of the video frame feature $F_j$, $\|*\|$ represents a norm of a vector $*$.

According to the equation above, the similarity between video frame features can be calculated and the feature similarity matrix can be obtained. The i-th row in the feature similarity matrix is the feature similarity between the i-th video frame feature and all video frame features.

It can be understood that feature similarity can describe the degree of similarity between video frame features. Through the feature similarity matrix, information exchange between originally independent video frame features can be realized. This enables a comprehensive understanding of the global feature information of the target video sequence, avoiding the reliance solely on local feature information to describe video features.

Step S1032: Perform feature weight calculation on each of the video frame features to obtain the feature weight of each of the video frame features according to the feature similarity matrix.

In one embodiment, after the feature similarity matrix is calculated, feature weight calculation can be performed on each video frame feature according to the feature similarity matrix to obtain the feature weight of each video frame feature.

Specifically, the feature weight of the i-th video frame feature can be obtained by averaging the i-th row in the feature similarity matrix. The specific calculation equation can be as follows:

$$s_i = \frac{1}{T} \sum_{t=1}^{T} K_{i,t},$$

where $s_i$ is the feature weight of the i-th video frame feature $F_i$, $K_{i,t}$ is a t-th feature similarity (i.e., the feature similarity between the i-th video frame feature and the t-th video frame feature) in an i-th row in the feature similarity matrix, and T represents an amount of the video frames in the target video sequence. According to the equation above, the feature weight of each video frame can be obtained.

Step S104: Perform feature weighting on each of the video frame features according to the feature weight of each of the video frame features to obtain video features of the target video sequence.

In one embodiment, feature weighting can be performed on each video frame feature according to the feature weight of each video frame feature to obtain the video features of the target video sequence.

It can be understood that the feature weight of a video frame feature can indicate the importance of the video frame feature to the video feature of the target video sequence. By weighting each video frame feature, the important feature information in the target video sequence can be effectively conveyed and the video features of the target video sequence can be obtained.

Specifically, weighting can be performed on each video frame feature according to the following equation:

$$F = \frac{1}{T} \sum_{t=1}^{T} s_t F_t,$$

where F represents the video features of the target video sequence, $F_i$ represents the i-th video frame feature, and $s_t$ is the feature weight of the video frame feature $F_t$.

In one embodiment, after the video features of the target video sequence are obtained, subsequent tasks such as classification, learning, and recognition can be performed based on the video features.

By performing the method described above, the feature weight of each video frame feature can be determined based on the video frame features of all video frames in the video sequence. Therefore, the feature information of all video frames can be fully utilized to extract features of the video sequence, achieving a fully and accurate description of the video sequence, and improving the robustness of the video feature extraction method.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 5, in one embodiment, a video feature extraction device may include a video sequence acquisition module 401, a video frame feature extraction module 402, a feature weight calculation module 403, and a feature weighting module 404. The video sequence acquisition module 401 is to obtain a target video sequence that includes a number of video frames. The video frame feature extraction module 402 is to perform video frame feature extraction on the target video sequence to obtain video frame features of each of the video frames. The feature weight calculation module 403 is to perform feature weight calculation on each of the video frame features to obtain the feature weight of each of the video frame features; wherein the feature weight of each of the video frame features is determined by the video frame features of all of the video frames in the target video sequence. The feature weighting module 404 is to perform feature weighting on each of the video frame features according to the feature weight of each of the video frame features to obtain video features of the target video sequence.

In one embodiment, the feature weight calculation module 403 may include a similarity calculation unit and a feature weight calculation unit. The similarity calculation unit is to calculate a similarity of each of video frame features to obtain a feature similarity matrix. The feature weight calculation unit. The feature weight calculation unit is to perform feature weight calculation on each of the video frame features to obtain the feature weight of each of the video frame features according to the feature similarity matrix.

In one embodiment, the similarity calculation unit may include a convolution operation subunit and a similarity calculation subunit. The convolution operation subunit is to perform a convolution operation on each of the video frame features to obtain a feature vector of each of the video frame features. The similarity calculation subunit is to calculate the similarity of each of video frame features to obtain the feature similarity matrix according to the feature vector of each of the video frame features.

In one embodiment, the similarity is calculated according to the following equation:

$$K_{i,j} = \frac{\|f(F_i)f(F_j)\|}{\|f(F_i)\|\|f(F_j)\|},$$

where $K_{i,j}$ represents the feature similarity between a i-th video frame feature $F_j$ and a j-th video frame feature $F_j$, $f(F_i)$ represents the feature vector of the video frame feature $F_i$, $f(F_j)$ represents the feature vector of the video frame feature $F_j$, $\|*\|$ represents a norm of a vector *.

In one embodiment, the feature weight is calculated according to the following equation:

$$s_i = \frac{1}{T} \sum_{t=1}^{T} K_{i,t},$$

where $s_i$ is the feature weight of the i-th video frame feature $F_i$, $K_{i,t}$ is a t-th feature similarity in an i-th row in the feature similarity matrix, and T represents an amount of the video frames in the target video sequence.

In one embodiment, the feature weighting is performed according to the following equation:

$$F = \frac{1}{T} \sum_{t=1}^{T} s_t F_t,$$

where F represents the video features of the target video sequence, $F_t$ represents the t-th video frame feature, and $s_t$ is the feature weight of the video frame feature $F_t$.

In one embodiment, feature weighting module 404 may include a video frame feature extraction unit that is to perform video frame feature extraction on each of the video frames in the target video sequence to obtain the video frame features of each video frame using a preset video frame feature extraction network. The video frame feature extraction network is a deep neural network for video frame feature extraction.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented video feature extraction method, the method comprising:

obtaining a target video sequence that comprises a plurality of video frames;

performing video frame feature extraction on the target video sequence to obtain video frame features of each of the plurality of video frames;

performing feature weight calculation on each of the video frame features to obtain the feature weight of each of the video frame features; wherein the feature weight of each of the video frame features is determined by the video frame features of all of the video frames in the target video sequence, and wherein the feature weight of any video frame feature is an average of feature similarities between the same video frame feature and the video frame features of all of the video frames in the target video sequence; and performing feature weighting on each of the video frame features according to the feature weight of each of the video frame features to obtain video features of the target video sequence.

2. The method of claim 1, wherein performing feature weight calculation on each of the video frame features to obtain the feature weight of each of the video frame features comprises:

calculating a similarity of each of the video frame features to obtain a feature similarity matrix; and performing feature weight calculation on each of the video frame features to obtain the feature weight of each of the video frame features according to the feature similarity matrix.

3. The method of claim 2, wherein calculating the similarity of each of the video frame features to obtain the feature similarity matrix comprises:

performing a convolution operation on each of the video frame features to obtain a feature vector of each of the video frame features; and calculating the similarity of each of the video frame features to obtain the feature similarity matrix according to the feature vector of each of the video frame features.

4. The method of claim 3, wherein the similarity is calculated according to the following equation:

$$K_{i,j} = \frac{\|f(F_i)f(F_j)\|}{\|f(F_i)\|\|f(F_j)\|},$$

where $K_{i,j}$ represents the feature similarity between an i-th video frame feature $F_i$ and a j-th video frame feature $F_j$, $f(F_i)$ represents the feature vector of the video frame feature $F_i$, $f(F_j)$ represents the feature vector of the video frame feature $F_j$, $\|*\|$ represents a norm of a vector *.

5. The method of claim 4, wherein the feature weight is calculated according to the following equation:

$$s_i = \frac{1}{T}\sum_{t=1}^{T}K_{i,t},$$

where $s_i$ is the feature weight of the i-th video frame feature $F_i$, $K_{i,t}$ is a t-th feature similarity in an i-th row in the feature similarity matrix, and T represents an amount of the video frames in the target video sequence.

6. The method of claim 5, wherein the feature weighting is performed according to the following equation:

$$F = \frac{1}{T}\sum_{t=1}^{T}s_t F_t,$$

11 where F represents the video features of the target video sequence, $F_t$ represents a t-th video frame feature, and $s_t$ is the feature weight of the video frame feature $F_t$.

7. The method of claim 1, wherein performing video frame feature extraction on the target video sequence to obtain video frame features of each of the plurality of video frame comprises:

performing video frame feature extraction on each of the video frames in the target video sequence to obtain the video frame features of each video frame using a preset video frame feature extraction network; wherein the video frame feature extraction network is a deep neural network for video frame feature extraction.

8. A device for extracting video features comprising:

one or more processors; and a memory coupled to the one or more processors, the memory storing programs that, when executed by the one or more processors, cause performance of operations comprising:

obtaining a target video sequence that comprises a plurality of video frames;

performing video frame feature extraction on the target video sequence to obtain video frame features of each of the plurality of video frames;

performing feature weight calculation on each of the video frame features to obtain the feature weight of each of the video frame features; wherein the feature weight of each of the video frame features is determined by the video frame features of all of the video frames in the target video sequence, and wherein the feature weight of any video frame feature is an average of feature similarities between the same video frame feature and the video frame features of all of the video frames in the target video sequence; and performing feature weighting on each of the video frame features according to the feature weight of each of the video frame features to obtain video features of the target video sequence.

9. The device of claim 8, wherein performing feature weight calculation on each of the video frame features to obtain the feature weight of each of the video frame features comprises:

calculating a similarity of each of the video frame features to obtain a feature similarity matrix; and performing feature weight calculation on each of the video frame features to obtain the feature weight of each of the video frame features according to the feature similarity matrix.

10. The device of claim 9, wherein calculating the similarity of each of the video frame features to obtain the feature similarity matrix comprises:

performing a convolution operation on each of the video frame features to obtain a feature vector of each of the video frame features; and calculating the similarity of each of the video frame features to obtain the feature similarity matrix according to the feature vector of each of the video frame features.

11. The device of claim 10, wherein the similarity is calculated according to the following equation:

$$K_{i,j} = \frac{\|f(F_i)f(F_j)\|}{\|f(F_i)\|\|f(F_j)\|},$$

where $K_{i,j}$ represents the feature similarity between a i-th video frame feature $F_i$ and a j-th video frame feature $F_j$, $f(F_i)$ represents the feature vector of the video frame feature $F_i$, $f(F_j)$ represents the feature vector of the video frame feature $F_j$, $\|*\|$ represents a norm of a vector $*$.

12. The device of claim 11, wherein the feature weight is calculated according to the following equation:

$$s_i = \frac{1}{T}\sum_{t=1}^{T} K_{i,t},$$

where $s_i$ is the feature weight of the i-th video frame feature $F_i$, $K_{i,t}$ is a t-th feature similarity in an i-th row in the feature similarity matrix, and T represents an amount of the video frames in the target video sequence.

13. The device of claim 12, wherein the feature weighting is performed according to the following equation:

$$F = \frac{1}{T}\sum_{t=1}^{T} s_t F_t,$$

where F represents the video features of the target video sequence, $F_t$ represents a t-th video frame feature, and $s_t$ is the feature weight of the video frame feature $F_t$.

14. The device of claim 8, wherein performing video frame feature extraction on the target video sequence to obtain video frame features of each of the plurality of video frame comprises:

performing video frame feature extraction on each of the video frames in the target video sequence to obtain the video frame features of each video frame using a preset video frame feature extraction network; wherein the video frame feature extraction network is a deep neural network for video frame feature extraction.

15. A non-transitory computer-readable storage medium storing instructions that, when executed by at least one processor of a device, cause the at least one processor to perform a method, the method comprising:

obtaining a target video sequence that comprises a plurality of video frames;

performing video frame feature extraction on the target video sequence to obtain video frame features of each of the plurality of video frames;

performing feature weight calculation on each of the video frame features to obtain the feature weight of each of the video frame features; wherein the feature weight of each of the video frame features is determined by the video frame features of all of the video frames in the target video sequence, and wherein the feature weight of any video frame feature is an average of feature similarities between the same video frame feature and the video frame features of all of the video frames in the target video sequence; and performing feature weighting on each of the video frame features according to the feature weight of each of the video frame features to obtain video features of the target video sequence.

16. The non-transitory computer-readable storage medium of claim 15, wherein performing feature weight calculation on each of the video frame features to obtain the feature weight of each of the video frame features comprises:

calculating a similarity of each of the video frame features to obtain a feature similarity matrix; and performing feature weight calculation on each of the video frame features to obtain the feature weight of each of the video frame features according to the feature similarity matrix.

17. The non-transitory computer-readable storage medium of claim 16, wherein calculating the similarity of each of the video frame features to obtain the feature similarity matrix comprises:

performing a convolution operation on each of the video frame features to obtain a feature vector of each of the video frame features; and calculating the similarity of each of the video frame features to obtain the feature similarity matrix according to the feature vector of each of the video frame features.

18. The non-transitory computer-readable storage medium of claim 17, wherein the similarity is calculated according to the following equation:

$$K_{i,j} = \frac{\|f(F_i)f(F_j)\|}{\|f(F_i)\|\|f(F_j)\|},$$

where $K_{i,j}$ represents the feature similarity between a i-th video frame feature $F_j$ and a j-th video frame feature $F_j$, $f(F_i)$ represents the feature vector of the video frame feature $F_i$, $f(F_j)$ represents the feature vector of the video frame feature $F_j$, $\|*\|$ represents a norm of a vector $*$.

19. The non-transitory computer-readable storage medium of claim 18, wherein the feature weight is calculated according to the following equation:

$$s_i = \frac{1}{T}\sum_{t=1}^{T} K_{i,t},$$

where $s_i$ is the feature weight of the i-th video frame feature $F_i$, $K_{i,t}$ is a t-th feature similarity in an i-th row in the feature similarity matrix, and T represents an amount of the video frames in the target video sequence.

20. The non-transitory computer-readable storage medium of claim 19, wherein the feature weighting is performed according to the following equation:

$$F = \frac{1}{T}\sum_{t=1}^{T} s_t F_t,$$

where F represents the video features of the target video sequence, $F_t$ represents a t-th video frame feature, and $s_t$ is the feature weight of the video frame feature $F_t$.

* * * * *